(12) United States Patent
Fukuda (10) Patent No.: US 7,299,401 B2
(45) Date of Patent: Nov. 20, 2007

(54) ERROR CORRECTION CODE RECORDING METHOD AND RECORDING APPARATUS USING THE SAME

(75) Inventor: Shinichi Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 509 days.

(21) Appl. No.: 10/755,535

(22) Filed: Jan. 12, 2004

(65) Prior Publication Data

US 2004/0193999 A1    Sep. 30, 2004

(30) Foreign Application Priority Data

Jan. 14, 2003    (JP) .............................. 2003-006282

(51) Int. Cl.
*G11C 29/00* (2006.01)
(52) U.S. Cl. ...................... 714/769; 714/755
(58) Field of Classification Search ................ 714/702, 714/758, 763, 755, 769
See application file for complete search history.

(56) References Cited

U.S. PATENT DOCUMENTS

| | | | |
|---|---|---|---|
| 5,084,786 A * | 1/1992 | Konno et al. ................. 360/13 |
| 5,369,641 A * | 11/1994 | Dodt et al. ................... 714/702 |
| 5,604,603 A * | 2/1997 | Yoshinaka et al. .......... 386/100 |
| 6,079,043 A * | 6/2000 | Yoshiura et al. ............. 714/758 |
| 6,292,623 B1 * | 9/2001 | Sugiyama et al. ............. 386/81 |
| 6,560,402 B1 * | 5/2003 | Misawa et al. ................ 386/69 |

FOREIGN PATENT DOCUMENTS

| JP | 2000 57510 | 2/2000 |
|---|---|---|
| JP | 2001 273096 | 10/2001 |

\* cited by examiner

*Primary Examiner*—Guy Lamarre
*Assistant Examiner*—Mujtaba K. Chaudry
(74) *Attorney, Agent, or Firm*—Frommer Lawrence & Haug LLP; William S. Frommer; Paul A. Levy (57) ABSTRACT

When data is recorded onto a tape-shaped recording medium using N recording heads disposed on a rotary drum, of first and second series codes orthogonal to each other, the first series code is recorded by any one of the recording heads, and the second series code is recorded across N tracks formed by the N recording heads per revolution of the rotary drum. The redundancy rate of the second series code is set to 1/N or more. As a result, a recording apparatus and method can be provided, which can correct almost all errors at a ratio of one to N tracks even if one whole track of data is completely destroyed without increasing the redundancy rate.

2 Claims, 10 Drawing Sheets

CODE (36, 30, 7)

36 : NUMBER OF SYMBOLS IN CODE
30 : NUMBER OF DATA SYMBOLS
7 : MINIMUM DISTANCE BETWEEN CODES

CODE STRUCTURE EXAMPLE

RELATED ART

WITH ERROR

FIG. 14

RECORDING BY ONE RECORDING HEAD PER AZIMUTH TRACK

FIG. 15

RECORDING BY TWO RECORDING HEADS PER AZIMUTH TRACK

ONE-HEAD-PER-AZIMUTH-TRACK RECORDING

TWO-HEAD-PER-AZIMUTH-TRACK RECORDING

ERROR CORRECTION CODE RECORDING METHOD AND RECORDING APPARATUS USING THE SAME

CROSS REFERENCE TO RELATED APPLICATIONS

The present document is based on Japanese Priority Document JP2003-006282, filed in the Japanese Patent Office on Jan. 14, 2003, the entire contents of which being incorporated herein by reference.

BACKGROUND OF THE INVENTION

1. Field of the Invention

The present invention relates to a helical scan type recording apparatus capable of recording data as inclined tracks onto, e.g., a tape-shaped recording medium, and a recording method therefor.

2. Description of Related Art

Magnetic recording systems of a helical scan type have hitherto been used extensively by, e.g., computer data systems or the like in order to back up data stored in their hard disk.

To accommodate errors during recording/reproduction, some magnetic recording systems use a method wherein data is recorded by adding thereto an error correction code (ECC) which can correct erroneous data, so that, e.g., even when trouble occurs in part of their recording/reproducing system, the data can be recorded correctly (Japanese Unexamined Patent Application Publication No.2001-273096). Some other magnetic recording systems deploy an error correcting device which can record or reproduce data, e.g., even when one of a plurality of helical scan type recording heads fails (Japanese Unexamined Patent Application Publication No. H10-21657).

Figure 7:
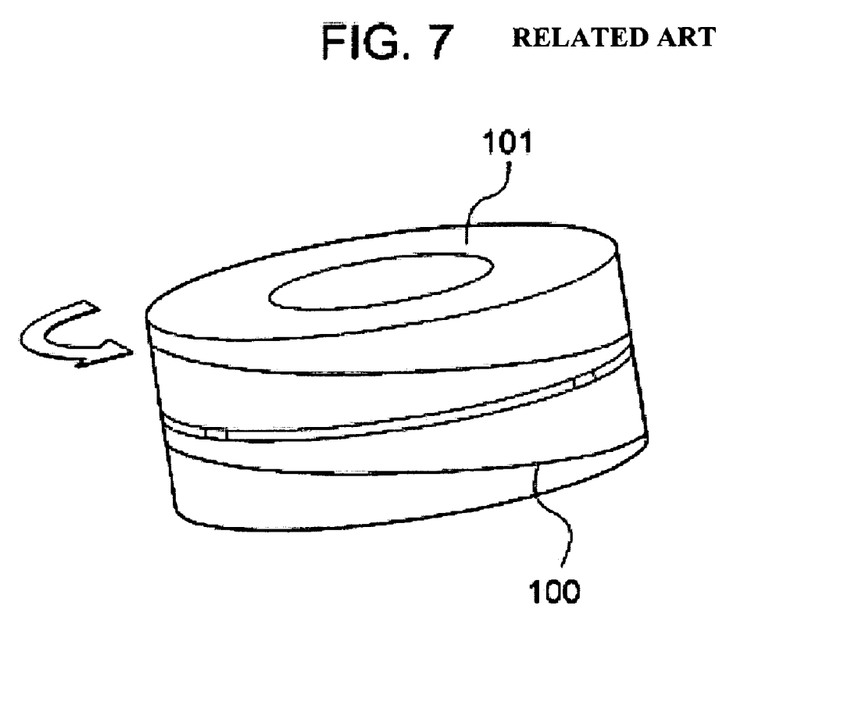
FIG. 7 illustrates a reproducing technique used by a conventional helical scan system.
Figure 8:
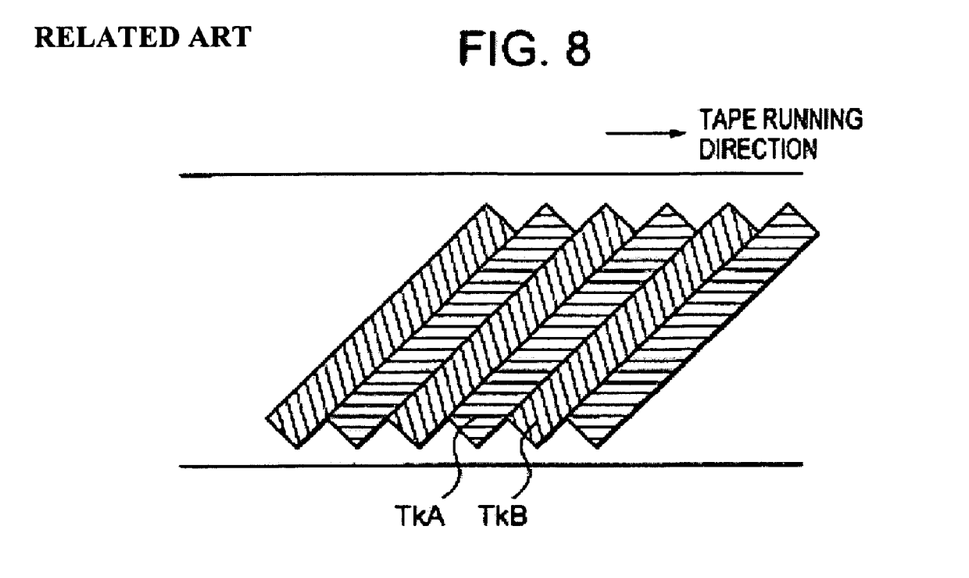
FIG. 8 illustrates azimuth recording.

Here, a helical scan type magnetic recording system will be outlined. In the helical scan system, a magnetic tape 100 is wrapped at an angle around a rotary head drum 101 as shown in, e.g., FIG. 7. Under this condition, the tape 100 is moved so that the head drum 101 rotates in the direction of the arrow, whereby a head scans at the angle with respect to the tape running direction. In this way, tracks are formed on the tape 100 by recording data at angles with respect to the tape running direction, or data is read from such tracks, as shown in FIG. 8.

Furthermore, the above-mentioned helical scan system adopts so-called azimuth recording. In azimuth recording, a pair of heads is used with their gaps slanted at different azimuth angles A and B, respectively, to alternately form on the magnetic tape 100 a track TkA depicting a recording pattern at the azimuth angle A and a track TkB depicting a recording pattern at the azimuth angle B, as shown in FIG. 8.

Figure 9:
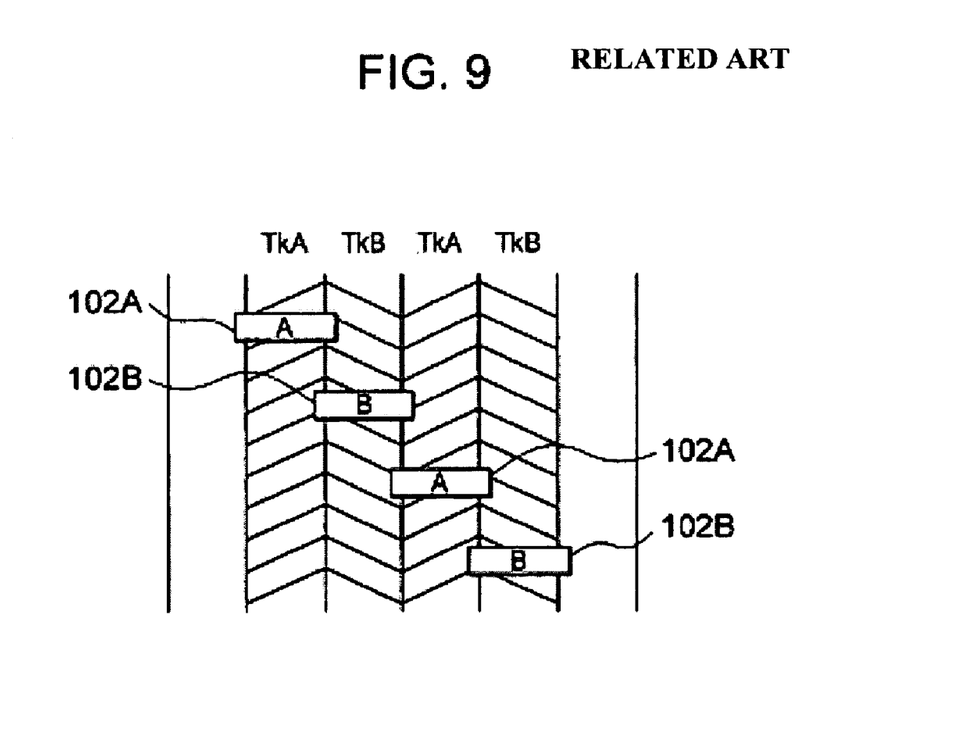
FIG. 9 illustrates a reproducing operation corresponding to an azimuth recording.

To reproduce data from a track recorded by such azimuth recording as mentioned above, a reproducing head 102A corresponding to the track TkA is used, and a reproducing head 102B is used for the track TkB recorded at the azimuth angle B as shown in FIG.9. In this way, signals produced in adjacent tracks can suppress themselves from affecting each other as noise owing to the azimuth effect, whereby a higher density recording can be implemented.

As one data reproducing technique in the helical scan technology, a tracking servo system is widely known in the art, in which the thus formed tracks are read through single scanning performed by a reproducing head. As shown in, e.g., FIG. 10, the tracking servo system controls a reproducing head 102 to keep the head constantly right on a track Tk so that all the data recorded on the track Tk will be read by causing the single head 102 to scan only once.

Figure 10:
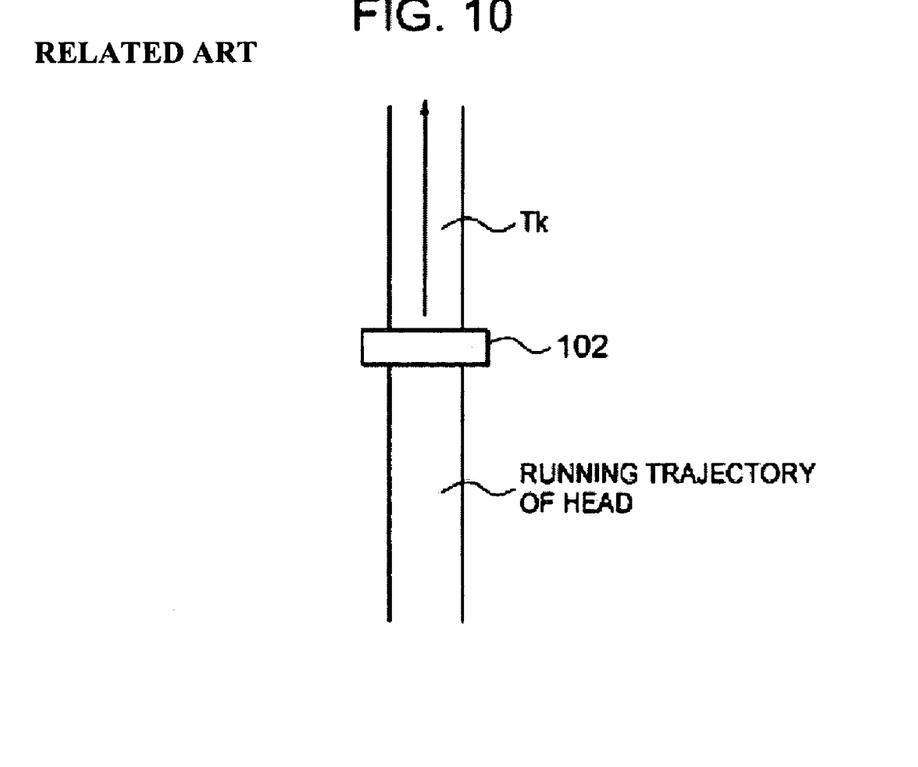
FIG. 10 illustrates a tracking servo system.

Thus, the tracking servo system gathers error information, e.g., by comparing a block-based scanning time with a pre-defined reference value in each track Tk, and the scanning position of the reproducing head 102 is controlled based on the error information to maintain the so-called "just tracking state" (Japanese Unexamined Patent Application Publication No. H09-245394).

As another reproducing technique in the helical scan technology, a non-tracking (NT) system is known in the art. In the NT system, data is scanned during reproduction at a track density twice as much as that of the recording period. Two reproduced signals are obtained on the average per track, and the better one is used for the data reproduction.

Figure 11:
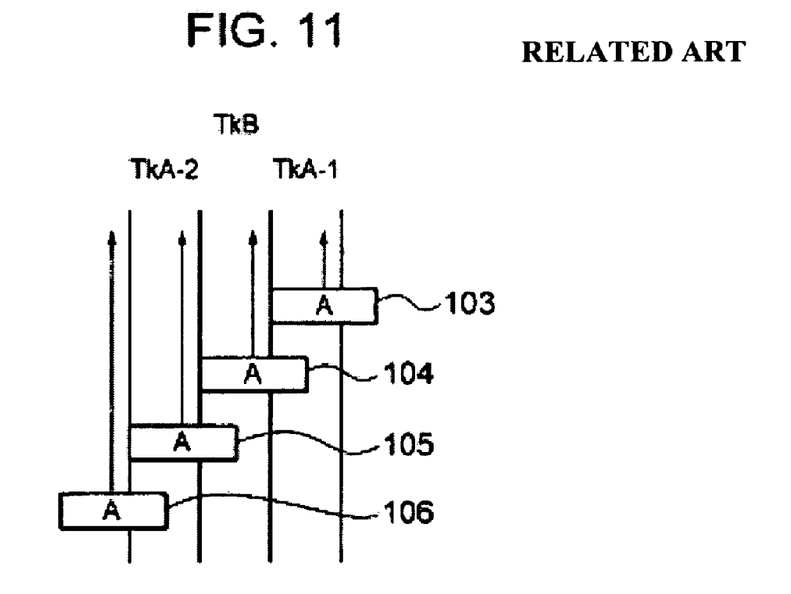
FIG. 11 illustrates a non-tracking system.

FIG. 11 conceptually shows the relationship between recorded tracks and reproducing heads in a NT system. Note that a description is given only of reproduction of azimuth tracks A in FIG. 11, and a description of azimuth tracks B will be omitted. Here, the tracking servo system as a reproducing technique would use reproducing heads 103 and 105 to scan tracks TkA-1 and TkA-2 to reproduce data, respectively. On the contrary, the NT system, which scans data during reproduction at a track density double as that of during recording, would cause a reproducing head 104 to intervene for scanning between the scanning operations performed by the reproducing heads 103 and 105.

In an example shown in FIG. 11, the track TkA-1 is scanned by the heads 103 and 104, and both heads provide effective reproduced signals for the track TkA-1. In this case, however, a comparison between the heads 103 and 104 indicates that the head 103 overhangs the track TkA-1 wider and, in addition, is less likely to near the track TkA-2 next to the adjacent track of the track TkA-1. Therefore, the reproducing head 103 will provide a more satisfactory reproduced signal. And only a correctly read portion of the thus reproduced signal is re-arranged to provide stream data. Such an NT system requires neither accurate tracking servo nor accurate scanning angle with respect to tracks, thus making the system free from mechanical tolerances, for example.

SUMMARY OF THE INVENTION

In order to increase data transfer rate during recording in a helical scan type magnetic recording system such as mentioned above, either the recording frequency may be increased or the number of recording and reproducing heads, i.e., recording channels may be increased to process data parallelly.

Higher frequency recording can be achieved by improving the high frequency performance of a device. In case, e.g., improvements in device performance fail to keep up with the speed requirements of the magnetic recording system, then a viable solution would be to increase the number of recording channels in order to perform parallel processing.

Additionally, in order to scan data during reproduction at a density twice as much as that of the recording period in the above-mentioned NT reproducing system, either two reproducing heads may be disposed for one recording head, or one reproducing head may be used to scan the same track twice by making the rotating speed of the rotary head drum 101 during reproduction twice as much as that of the recording period. Alternatively, using as many recording heads as reproducing heads while keeping the rotating speed of the drum 101 equal during both recording and reproduction, recording may be performed only once for every two revolutions of the drum 101. Many NT systems of the above type tend to increase their transfer rate during recording/reproduction by increasing the number of recording/reproducing heads.

When the number of reproducing heads is increased, if, e.g., a single recording head is mounted per track to form each of tracks TkA and TkB respectively having different azimuth angles, then two reproducing heads is required per track, and hence a total of four reproducing heads is required to reproduce data from both tracks TkA and TkB. That is, to reproduce data from, e.g., the track TkA, two reproducing heads A11 and A12 are needed as shown in FIG. 12.

In order to further improve the transfer rate during recording/reproduction, e.g., two recording heads may be used to alternately record tracks of the same azimuth. That is, each of the tracks TkA and TkB may be formed using two recording heads. In this case, four reproducing heads are needed for each of the tracks TkA and TkB, and thus a total of eight reproducing heads is involved to reproduce data from both tracks. And the two reproducing heads A11 and A12 are similarly necessary as shown in FIG. 12, in order to reproduce data from the track TkA formed by one of the two recording heads.

Figure 12:
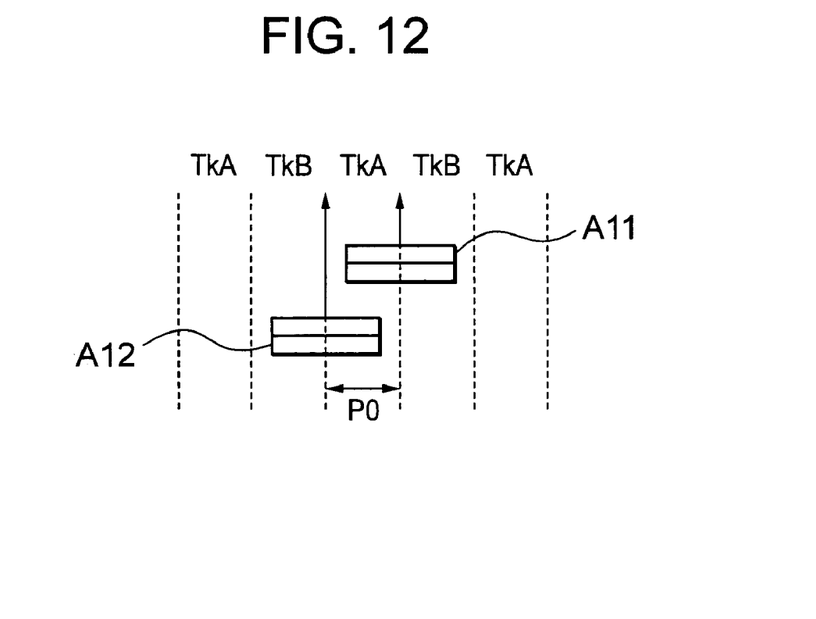
FIG. 12 shows how reproducing heads aligned at a standard pitch scan tracks on a magnetic tape.

The reproducing heads A11 and A12 are aligned with respect to a track as the drum 101 rotates and the tape runs such that the distance between their scanning positions equals such a standard pitch P0 as shown in FIG. 12. In this case, the heads A11 and A12 are aligned such that the standard pitch P0 exactly equals the track pitch. Furthermore, when the phase among the reproducing heads and the recorded track, i.e., their positional relationship is such as shown in FIG. 12, a worst tracking occurs, making reproduced signals worst in quality.

In other words, if the phase relationship among the reproducing heads A11 and A12 and the recorded track TkA shown in FIG. 12 changes as one of the heads A11 and A12 moves either to the left or right, respectively, then the head having moved near the center of the track TkA, and that head having neared the center provides a more satisfactory reproduced signal, to improve the reproduction quality.

Figure 13:
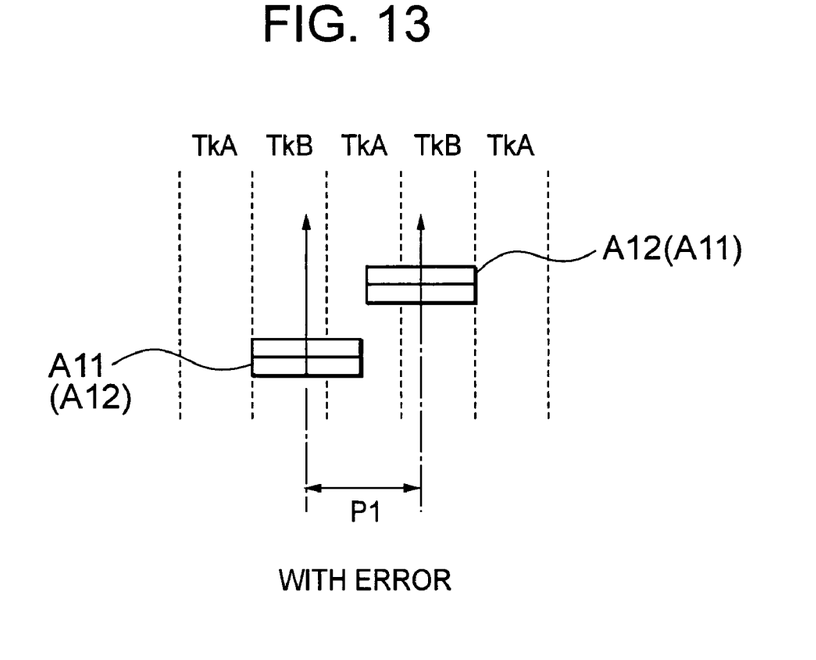
FIG. 13 shows how misaligned reproducing heads scan tracks on a magnetic tape.

However, the reproducing heads A11 and A12, when mounted at such positions, may undergo some error due to, e.g., certain mechanical problems, and in addition, may even be displaced in a direction orthogonal to the track. Under such circumstances, as shown in FIG. 13, if the two reproducing heads A11 and A12 are mounted out of alignment in a manner mutually moving away from the center of the track TkA, i.e., if the distance between their scanning positions changes from the standard pitch P0 to a pitch P1, then the reproducing output levels produced by these two reproducing heads greatly deteriorate.

Figure 14:
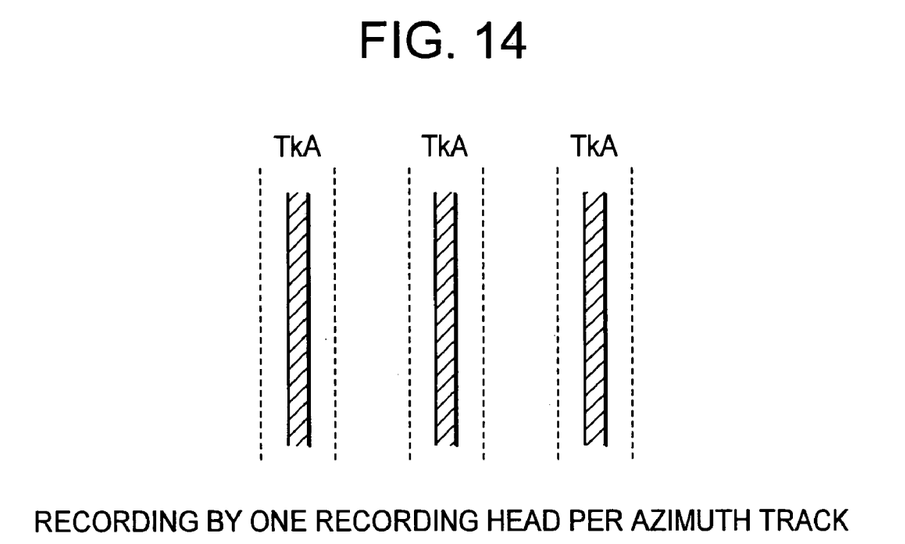
FIG. 14 illustrates an improper pattern recorded on a magnetic tape in a recording made by one recording head per azimuth.
Figure 15:
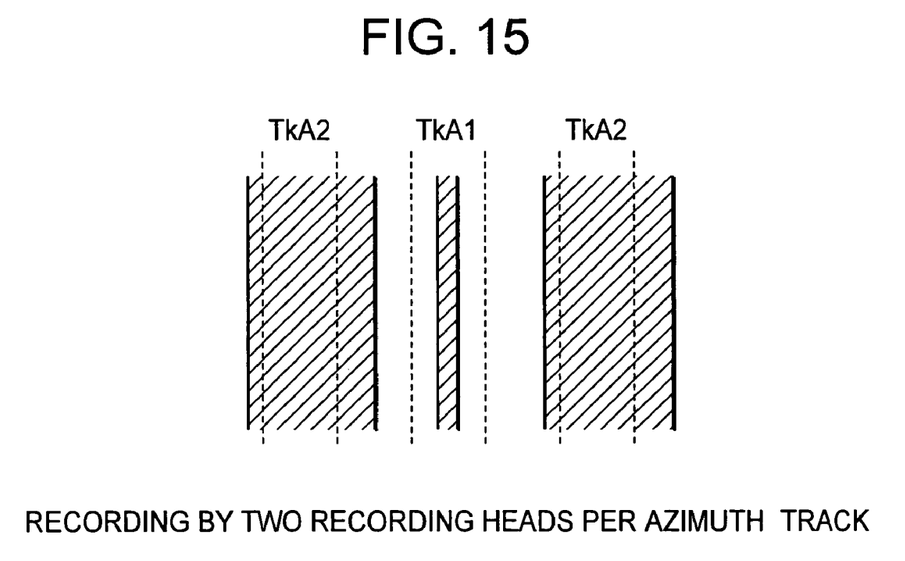
FIG. 15 illustrates an improper pattern recorded on a magnetic tape in a recording made by two recording heads per azimuth.

This misalignment may be experienced likewise by the recording head(s), thus producing on the magnetic tape 100 patterns of narrow recorded tracks or of narrow and wide recorded tracks, as shown in, e.g., FIGS. 14 and 15. In one pattern, the same azimuth tracks TkA would be recorded at the same width as shown in FIG. 14, if, e.g., one recording head is used per azimuth. That is, in this case, the tracks of the same azimuth are recorded by the same head, thus resulting in the same width.

On the contrary, if two recording heads are used per azimuth, i.e., if a total of four recording heads are mounted for recording the tracks TkA at the azimuth angle A and the tracks TkB at the azimuth angle B, i.e., even when the tracks are of the same azimuth, if they are recorded alternately by the different recording heads, then a track TkA1 and a track TkA2 respectively having different widths will appear alternately as shown in, e.g., FIG. 15.

Figure 16A:
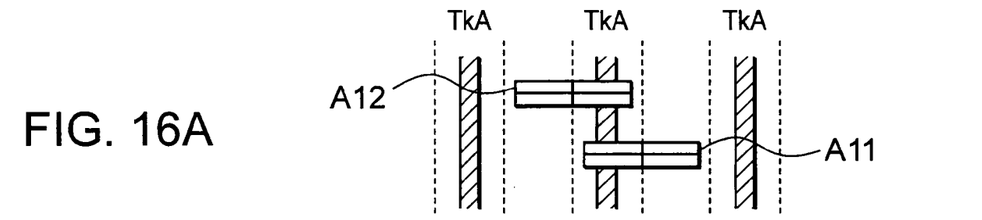
FIG. 16A illustrates an improper pattern recorded on a magnetic tape in a recording made by one recording head per azimuth.
Figure 16B:
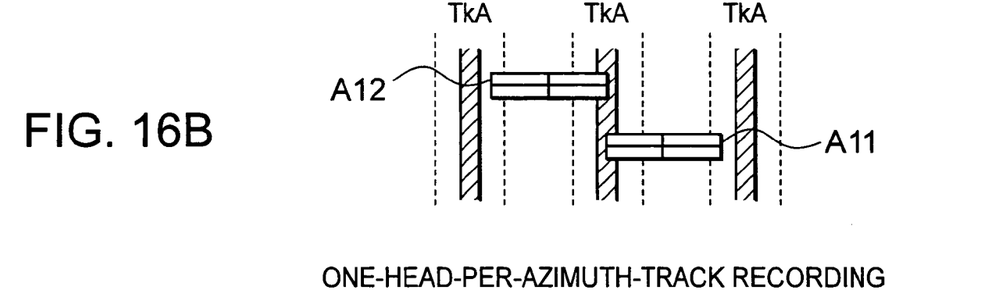
FIG. 16B illustrates an improper pattern recorded on a magnetic tape and misaligned reproducing heads, in a recording made by one recording head per azimuth.

Referring here to FIGS. 16A, 16B, 17A and 17B, a consideration is given to inconvenience caused by some error in mounting the reproducing heads onto the rotary head drum 101. First, FIGS. 16A and 16B schematically show scanning operations during NT-based reproduction in one-head-per-azimuth recording. For ease of explanation, only reproduction of the track TkA recorded at the azimuth angle A will be discussed.

When the track TkA is formed at a width smaller than a normal width, and if the two reproducing heads A11 and A12 for reproducing data from this track are positioned at the standard pitch P0, then the track TkA falls within their scanning range as shown in FIG. 16A, thus providing an adequately sized reproduced signal.

However, when, e.g., the reproducing heads A11 and A12 suffer some mounting errors to have a wider pitch as shown in FIG. 16B, the track TkA may get out of the scanning range of either of the heads A11 and A12. That is, in this case, it is difficult to obtain an adequate reproduction output, and thus the quality of the reproduced data will be largely impaired.

Figure 17A:
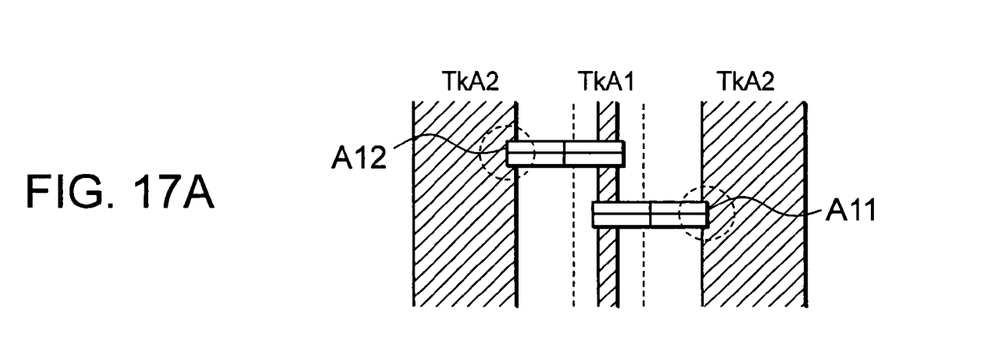
FIG. 17A illustrates an improper pattern recorded on a magnetic tape in a recording made by two recording heads per azimuth.
Figure 17B:
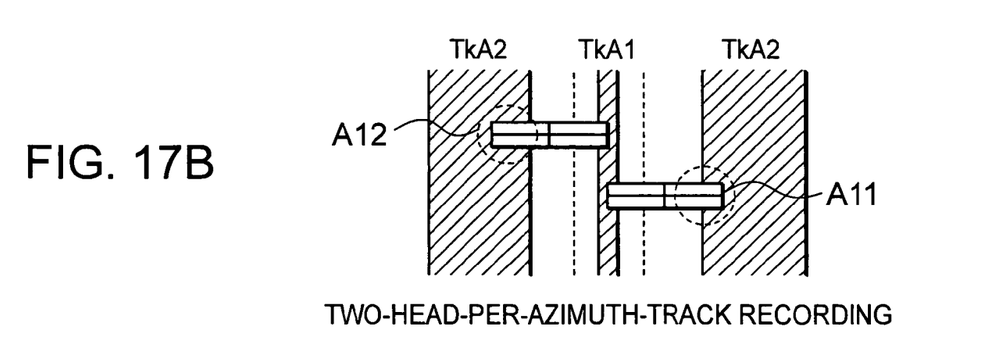
FIG. 17B illustrates an improper pattern recorded on a magnetic tape and misaligned reproducing heads, in a recording made by two recording heads per azimuth.

Furthermore, FIGS. 17A and 17B show scanning operations during NT-based reproduction when two recording heads are disposed per azimuth. In this case, if, e.g., the two recording heads for recording the track TkA at the azimuth angle A are misaligned, there may be a pattern of alternating wide and narrow strips as shown in the figures, with a track TkA1 recorded by one of the recording heads being narrow and tracks TkA2 recorded by the other head being wide, for example.

Under these circumstances, if the two reproducing heads A11 and A12 are aligned at the standard pitch P0, then the track TkA1 stays within their scanning range as shown in FIG. 17A, thus providing a satisfactory reproduced signal, but at the same time, these heads A11 and A12 are also close to the tracks TkA2 next to the adjacent tracks of the track TkA1, which tracks TkA2 are wide and of the same azimuth, and thus are likely to be affected by the noise from the tracks TkA2.

Furthermore, if, e.g., the two reproducing heads A11 and A12 are out of proper position so that their standard pitch P0 is increased to the pitch P1, then the track TkA1 may stay out of the scanning range of either of the reproducing heads A11 and A12.

Additionally, in this case, the reproducing heads A11 and A12 overhang the tracks TkA2 of the same azimuth, as encircled by the broken lines in FIG. 17B, suffering noise from these tracks TkA2. That is, in this case, the two reproducing heads A11 and A12 will face the worst scenario in which they cannot read recorded signals adequately from their own track TkA1 and do read recorded signals from the tracks TkA2 of the same azimuth next to the adjacent tracks of the track TkA1 as noise, thereby almost completely destroying one whole track of data.

However, in this case, when these heads have their height kept precisely, there would be no case where all the tracks cannot be read simultaneously at all times. As a result, if some of tracks recorded per revolution of the rotary head drum 101 are narrow, other tracks are wider than the standard width, and thus information could be recorded in a large-sized signal. In addition, when the reproducing heads are positioned wide apart from each other, some narrow tracks can be scanned satisfactorily in both rounds of a two-time scanning operation. That is, when a worst case occurs, an advantage is provided that comparatively high data reliable can be ensured in channels other than the worst channel.

As mentioned earlier, the conventional digital tape streamer records an ECC for correcting data errors during reproduction, on a magnetic tape as recorded data. Note that the ECC is a set of codes each being composed of data to be actually recorded (information) and parity bits (error correcting bits).

An ECC maybe recorded along a single track Tk, on across a plurality of tracks Tk, on a recording tape. When recorded along a single track Tk, the ECC can detect and correct errors only within that track Tk, and thus is advantageous in that the track Tk is unaffected by other tracks Tk having a high error rate. However, when its own track suffers too many errors to correct, the ECC is disadvantageous in that it cannot correct those errors using information on other tracks.

On the other hand, when the ECC is recorded across a plurality of tracks Tk, even when one of the tracks suffers many errors, these errors can be corrected using information on other tracks. However, when the other tracks suffer many errors, the former track Tk is affected by these other tracks.

Furthermore, in the case of, e.g., audio and video data, even if some of their reproduced data are lost, the lost data can be reproduced on a pseudo manner from the remaining data by interpolation. Thus, there are ECC systems usable on a practical level. Such systems would be suffice when only one track of data is completely destroyed due to dust or the like, since such one track of data can practically be recovered by interpolation from data on the other tracks. Thus, an ECC written within one track is usually used. However, when the code is recorded across a plurality of tracks, destruction of data within one track may likely lead to a loss of data on some of its neighboring tracks. This is why a so-called "inter-track code" in which an ECC is recorded across a plurality of tracks is considered unsuitable.

Furthermore, for example, in case that data loses its integrity even with one uncorrectable bit, it is necessary to have capability to correct even if one whole track of data is lost. Accordingly, the ECC recorded across tracks is suitable. However, ECCs used in current helical scan type magnetic recording apparatuses, which have been developed from audio/video formats, are not robust inter-track codes, but are only capable of correcting one out of every twenty-some tracks at most. However, these conventional codes have, in fact, been practical and satisfactory because total destruction of one whole track rarely occurs.

However, as mentioned above, when data is recorded by increasing the number of recording heads to four, part of the data may be reproduced nearly completely destroyed at a ratio of one to four tracks (channels) in a worst case.

In view of the above and other problems, it is desirable to provide a recording apparatus and method capable of correcting errors even if one of N channels suffers a high error rate, e.g., even if a channel has almost totally destroyed data.

In one embodiment of the present invention, the present invention provides a recording apparatus of a helical scan type capable of recording data as inclined tracks onto a tape-shaped recording medium, which recording apparatus includes a rotary drum having N recording heads (where N is a plural number) on a circumference thereof; first series code generating means for generating a first series code by adding a first parity to a first data array in a predetermined direction; second series code generating means for generating a second series code by adding a second parity to a second data array in a direction orthogonal to the direction of the first data array; and recording control means for controlling recording such that the first series code is recorded by one of the N recording heads and the second series code is recorded by the N recording heads in a dispersed manner, on the tape-shaped recording. The second series code generating means generates the second series code such that a ratio of the second parity to the second series code becomes 1/N or more.

In another embodiment, the present invention provides a recording method for a recording apparatus of a helical scan type that records data as inclined tracks onto a tape-shaped recording medium by N recording heads (where N is a plural number) disposed on a circumference of a rotary drum, which recording method includes generating a first series code by adding a first parity to a first data array in a predetermined direction; generating a second series code such that a ratio of second parity to a second data array becomes 1/N or more, wherein the second parity is added to the second data array in a direction orthogonal to the direction of the first data array of the first series code; and controlling recording such that the first series code is recorded by one of the N recording heads on the tape-shaped recording medium and the second series code is recorded by the N recording heads in a dispersed manner.

According to the embodiment of the present invention, when data is recorded onto the tape-shaped recording medium using the N recording heads disposed on the rotary drum, the two serial codes orthogonal to each other are generated as error correction codes. Of these serial codes, the redundancy rate of the second series code recorded across N tracks formed by the N recording heads is set to 1/N or more, whereby almost all errors may be corrected at a ratio of one to N tracks even if one whole track of data is completely destroyed.

As a result, even when a system for N-channel recording/reproduction per revolution of a drum carrying N heads constantly fails to reproduce one channel of data, i.e., fails to discriminate data due to a poor S/N ratio, the system can reproduce such recorded data from data of other channels.

DESCRIPTION OF THE PREFERRED EMBODIMENTS

A magnetic recording apparatus according to an embodiment of the present invention will now be described. In this embodiment, a digital tape streamer drive for backup of computer data and the like is taken as an example of a recording apparatus.

Figure 1:
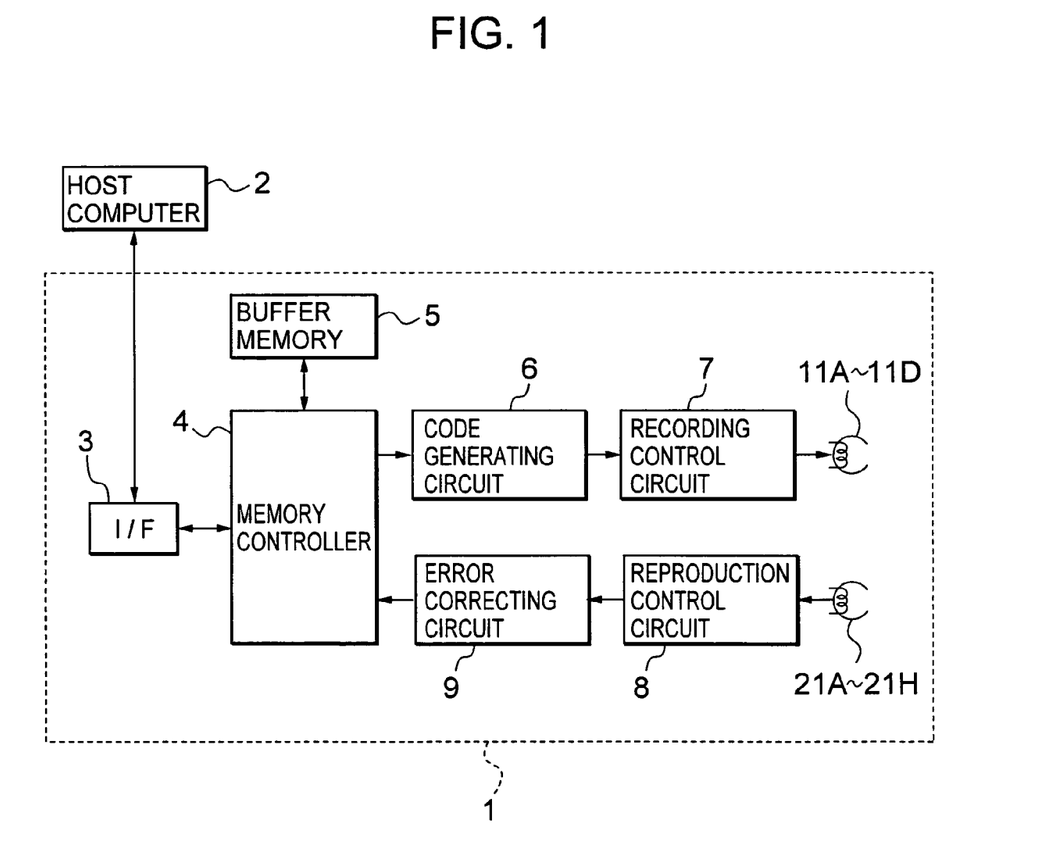
FIG. 1 shows the configuration of a tape streamer drive which is an embodiment of the present invention.

FIG. 1 shows the configuration of a recording/reproducing system of a tape streamer drive 1 according to this embodiment. The drive 1 inputs and outputs data such as commands, statuses, and real data for recording to and reproduction from a host computer 2 in order to back up data of the computer 2.

A memory controller 4 inputs real data for recording via an interface 3, temporarily holds the data in a buffer memory 5, and outputs the data to a code generating circuit 6 in the subsequent stage, during recording. The controller 4 also temporarily holds in the buffer memory 5 reproduced data from an error correcting circuit 9, and outputs the data to the computer 2 via the interface 3 by a predetermined data unit.

Figure 4:
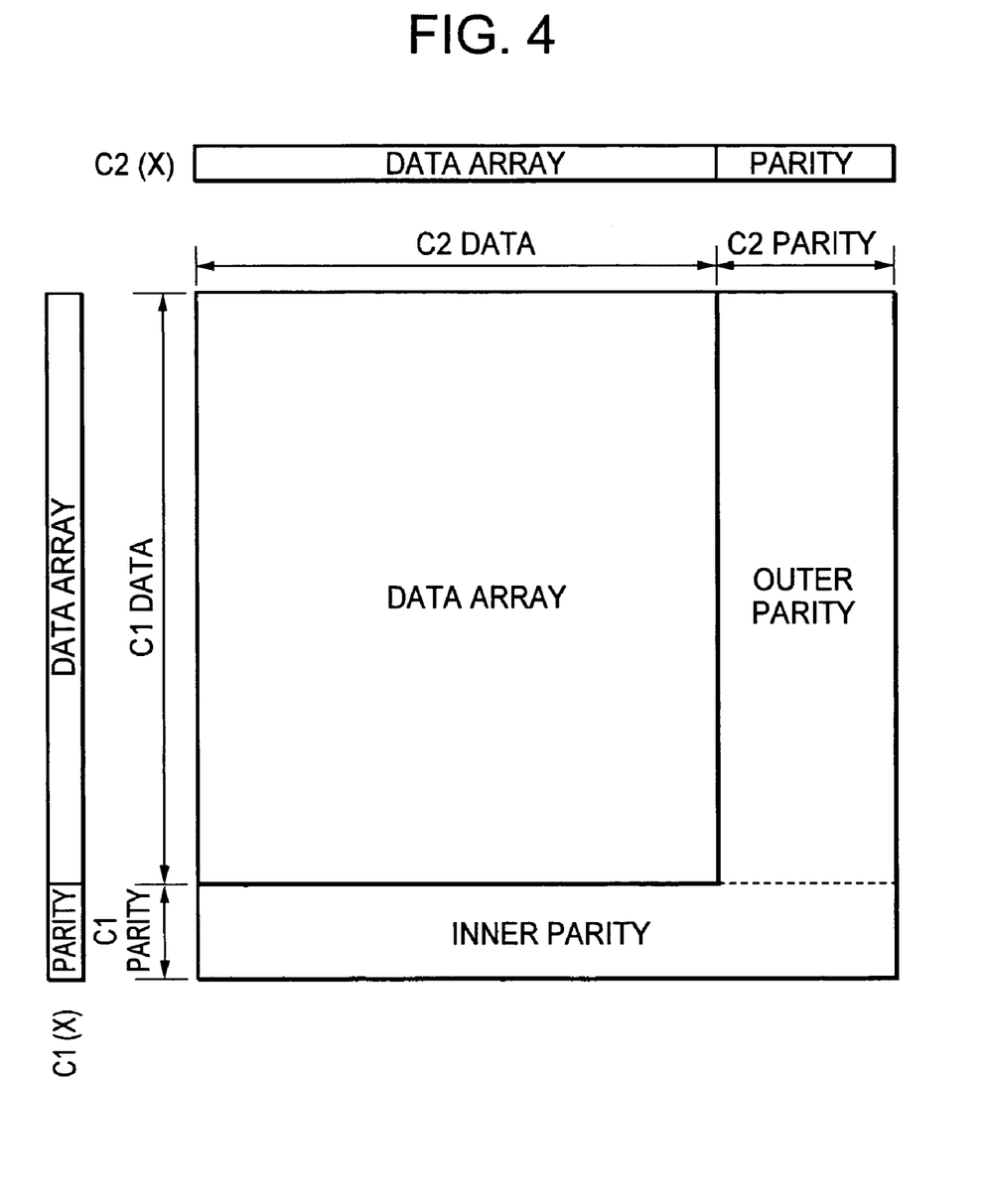
FIG. 4 illustrates the concept of a two-dimensional orthogonal code.

The code generating circuit 6 generates a two-dimensional orthogonal code such as to be described later based on a predetermined block unit of data inputted from the memory controller 4. That is, as shown in FIG. 4, inner parities (C1 parity) are generated from C1 data which is a data array arranged in a predetermined direction, and the generated C1 parities are added to the C1 data to generate a C1-series code.

The code generating circuit 6 also generates outer parities (C2 parity) bytes from C2 data which is a data array arranged in a direction orthogonal to the direction of the C1 data, and adds the generated C2 parities to the C2 data to generate a C2-series code. And it is arranged in this embodiment such that the ratio of the C2 parities generated by this code generating circuit 6 to the C2-series code is 1/N or more (where N is the number of recording heads). Note that these C2 parities will be described later. And such C1- and C2-series codes generated by the code generating circuit 6 are outputted to a recording control circuit 7.

While the code generating circuit 6 is described as generating both the C1- and C2-series codes in this embodiment, this is merely an example. In other embodiments, the circuit 6 may comprise a C1 code generator for the C1-series code and a C2 code generator for the C2-series data to generate these codes separately.

The recording control circuit 7 is configured to control the output order of the data. Of the C1- and C2-series codes supplied from the code generating circuit 6, one unit of C1-series code is recorded by any of four recording heads 11A to 11D and one unit of C2-series code is recorded by these four recording heads 11A to 11D in a dispersed manner. And these recording heads 11A to 11D are driven according to this serial data array the output order of which is thus adjusted.

Here, the recording heads 11A to 11D are mounted on a rotary head drum together with reproducing heads 21A to 21H. The drum rotates at a predetermined rotational speed while wrapping around itself a magnetic tape that runs at a predetermined speed. Thus, the tape streamer drive 1 of this embodiment sequentially forms inclined tracks along the magnetic tape to record the data on these inclined tracks.

The reproducing heads 21A to 21H each are configured to scan along a scanning trajectory of the corresponding recording head, whereby the reproducing head outputs a reproduced signal from a recorded track immediately after recording by the corresponding one of the recording heads 11A to 11D during recording, and from a desired one of recorded tracks during reproduction.

A reproduction control circuit 8 identifies is 1s and 0s by, e.g., amplification and waveform equalization of the reproduced signals from the reproducing heads 21A to 21H. In addition, the circuit 8 converts the identified binary bits into an array of parallel data via word synchronization, for output to the error correcting circuit 9. The error correcting circuit 9 detects errors using the C1 and C2 parities added by the code generating circuit 6 to the data from the reproduction control circuit 8, for output to the memory controller 4. Note that the error correcting circuit 9 may also include two separate error correcting circuits, one for the C1-series code and the other for the C2-series code.

Note that recording/reproducing operations of the tape streamer drive 1 are controlled by a system controller (not shown).

Figure 2:
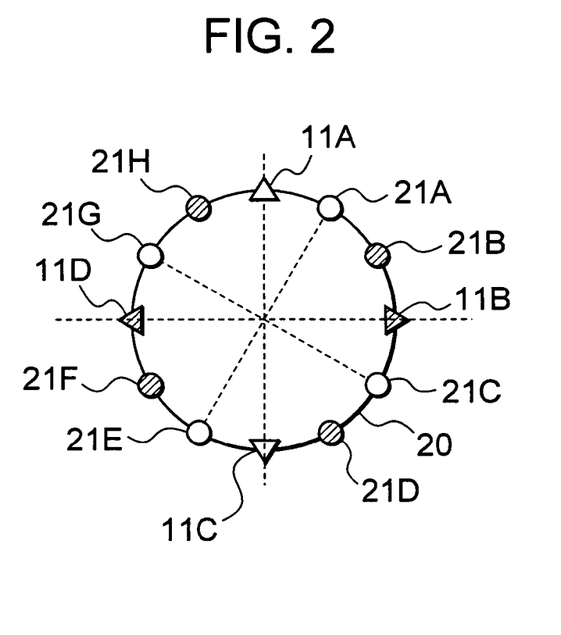
FIG. 2 shows an example of positions at which recording and reproducing heads are mounted to a rotary head drum.

FIG. 2 shows an example of mounting positions of the recording heads 11A to 11D and the reproducing heads 21A to 21H on a rotary head drum 20 which is disposed on the tape streamer drive 1 of this embodiment. The configuration of the drum 20 shown in cross section in FIG. 2 is merely an example.

In the example shown in FIG. 2, the respective heads are positioned 30° spaced apart from each other on the outer circumference (the cylindrical surface) of the rotary head drum 20 in the order of the recording head 11A, the reproducing head 21A, the reproducing head 21B, the recording head 11B, and so on. In this case, as shown in the figure, the recording heads 11A and 11C are 180° apart from each other, and so are the recording heads 11B and 11D, on the cylindrical surface of the drum 20. And the four reproducing heads 21A, 21C, 21E and 21G are located at 90° to the others, and so are the rest of the four reproducing heads 21B, 21D, 21F and 21H.

Figure 3:
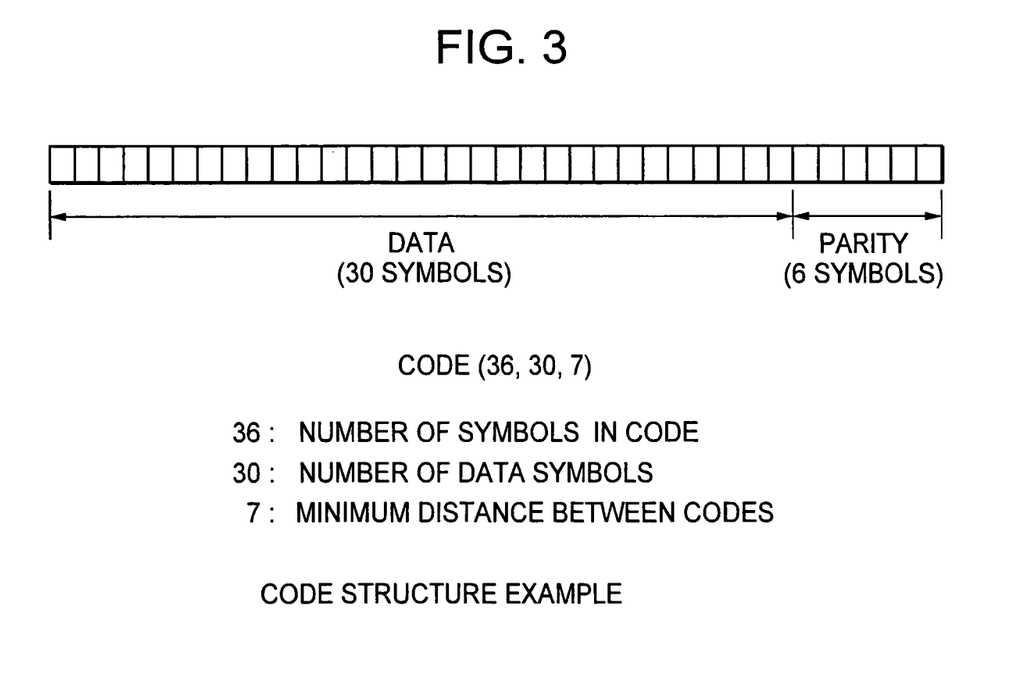
FIG. 3 illustrates the concept of an ECC.

Referring here to FIGS. 3 and 4, ECCs will be described. An "error correction code" (ECC) means a code wherein parity bit(s) is added to data having a certain number of bits, the parity bit(s) being generated from that data, and has functionality to detect the position of an error or correct the error using the parity bit(s) during reproduction. Note herein that a minimum unit of an ECC composed of data and parity bits will be simply called a "code". And a group of these codes will be denoted as a "code series".

A Reed-Solomon (RS) code, a typical ECC, handles information and errors by the symbol, not by the bit. A symbol forming such a code consists of, e.g., 8 bits. For example, a code shown in FIG. 3 consists of a total of 36 symbols, i.e., 30 data symbols and 6 parity symbols. Assuming here that one symbol consists of 8 bits, the 36-symbol code shown in FIG. 3 will take as many values as $4.97 \times 10^{86}$, or 256 to the 36th power. However, of such 36 symbols in the code, the 6 parity symbols are uniquely defined from the 30 data symbols, and thus the code can actually take only as many values as 256 to the 30th power.

Furthermore, the RS code can generally detect as many error symbols as the number of parity symbols. Also, half that number of errors could be corrected within the code. For example, the code such as shown in FIG. 3 would be incorrect with six erroneous words, but would be corrected into a new code with 7 erroneous words. Therefore, the distance between codes in the RS code shown in FIG. 3 is represented as "7". In other words, the RS code so configured as shown in FIG. 3 can detect up to six words in error with their locations identified, and can correct up to three words which is half these six words.

The RS code such as shown in FIG. 3 is represented as (36, 30, 7), where "36" is the total number of symbols; "30" is the number of data symbols; and "7" is the minimum distance between codes. In practice, not so many errors are corrected within a code. The reason is that with so many errors, it cannot be determined whether one code suffers "a" symbol errors or another code suffers "b" symbol errors, for example. Here, "a"+"b" makes the number of parity symbols +1. That is, e.g., in the code shown in FIG. 3, whether the code have three erroneous words or another code has four erroneous words cannot be determined, so miscorrections may likely result. That is why it is not preferable to correct many errors within a code.

For the above reason, ECCs are often two-dimensional or three-dimensional. FIG. 4 represents an ECC such as shown in FIG. 3 as a two-dimensional orthogonal code. In the two-dimensional orthogonal code shown in FIG. 4, one symbol is part of one code and is also part of another serial code. That is, one symbol is configured to be part of the C1-series code represented as a series in the vertical direction in FIG. 4 and at the same time, part of the C2-series code (extending in the horizontal direction as viewed in FIG. 4).

Under this configuration, even when many errors are found in one code, these errors can be dispersed over a plurality of codes in another code series. For example, even if one of the C1-series codes shown in FIG. 4 suffers so many errors that error correction cannot be performed by the C1 parities (inner parity) of the C1 code series, the erroneous symbol(s) could be corrected by C2-series codes. Thus, a plurality of two- or three-dimensional error correction series such as shown in FIG. 4 are often used for loss correction.

RS codes have a feature that as many errors as up to the number of parity symbols can be corrected if their locations are known. Thus, if there is a certain number of erroneous symbols within a code of one code series (e.g., the C1 series), then no correction is made, but all the symbols in the code are deemed suspicious and this information is delivered to another series (e.g., the C2 series). Then, the C2 series, knowing the suspicious locations, can correct as many erroneous symbols as the number of symbols of C2 parity. This is how the principle of the so-called loss correction works.

In the following, a method of creating an ECC for the digital tape streamer according to this embodiment will be described based on the above-mentioned discussion. The redundancy rate of a code used for magnetic recording apparatuses of a helical scan type in practical use hitherto is approximately 30%. Thus, the redundancy rate of a code used for the digital tape streamer of this embodiment will also be set to a value equivalent to or smaller than that. The term "redundancy rate" means a ratio of parity to a code length.

Conventional helical scan type magnetic recording apparatuses are provided with an error correction processing system in which even when, e.g., some reproduced audio and/or video data are lost, the lost data can be reproduced from the remaining data in a pseudo manner through interpolation on a practically sufficiently level. However, in such a system, it would suffice that data on one track corrupted due to, e.g., dust is sufficiently reproducible on a practical level by interpolation using data of other tracks, and hence an intra-track ECC is usually used, and an inter-track code is not suitable.

Hence, the conventional helical scan type magnetic recording apparatuses adopt a two-dimensional orthogonal code in which one code series is used as an intra-track code and the other as an inter-track code, with the number of parity in the intra-track code larger than that in the inter-track code. Parities are added such that, e.g., the redundancy rate of an intra-track code is about 25%, whereas the redundancy rate of an inter-track code is about 5%, to attain a redundancy rate of about 30% for the whole ECC.

However, when four recording heads 11A to 11D are mounted on the rotary head drum 20 as in the tape streamer drive 1 of this embodiment, a so-called worst track, which is narrow, may result due to their mounting inaccuracies. And in that case, a conventional ECC such as mentioned above could not correct errors.

To overcome this inconvenience, this embodiment has a feature that the ratio of parity symbols in an outer code series (C2 series) which extends over a plurality of tracks of a plurality of two- or three-dimensional ECC series is set to 1/N or more of the code length (the number of symbols) (where N is the number of recording heads (recording channels)).

That is, in this embodiment, any recording apparatus having four recording heads will have the ratio of parity symbols in a code extending across tracks (C2 series) is set to ¼ or more of the code length (the number of symbols); i.e., its redundancy rate is set to 25% or higher. As a result, even if, e.g., such a worst track as to destroy one whole track out of four tracks recorded by the four recording heads occur, that track can be reproduced by such a loss correction as mentioned above.

Furthermore, in this case, in order to keep the redundancy rate of the whole code under approximately 30%, the redundancy rate of an intra-track code would be only 5% or so, but the tape streamer drive 1 of this embodiment is arranged such that it can correct errors in that code almost completely even when the redundancy rate is about 5% or less.

This is because, as discussed previously, when a worst track occurs during four-channel recording using four recording heads, tracks other than the worst track have a wider width than their standard width. Accordingly, and the quality of reproduced data from these wider tracks is more satisfactory than that from the standard tracks. That is, if there is a narrow track in tracks recorded as the rotary head drum 20 makes one revolution, the other tracks have a wider width than their standard width, meaning that information is being recorded as a large-sized signal. Additionally, any reproducing heads spaced apart wide could scan some narrow tracks successfully in both rounds of a two-time scanning operation. Therefore, occurrence of a worst track would allow other tracks to provide more highly reliable data than in normal recording.

It would, in practice, be preferable to slightly increase the redundancy rate of the C2 code and reduce the redundancy rate of the C1 code accordingly, or to increase the redundancy rate of the whole code so that any errors left uncorrected in tracks other than a worst track could be taken care of.

Figure 5:
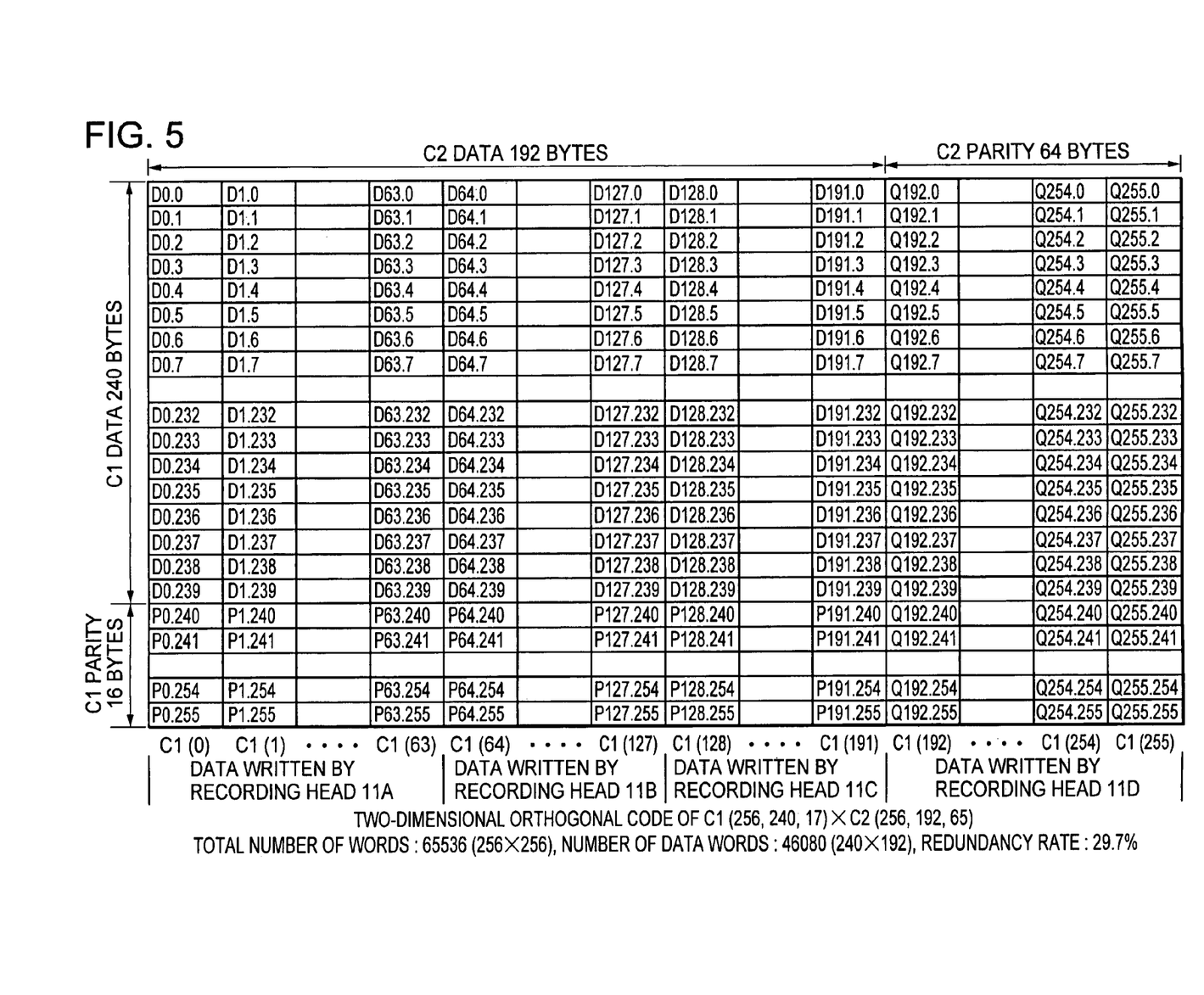
FIG. 5 shows an example structure of an ECC adapted for a tape streamer drive according to an embodiment of the present invention.

FIG. 5 shows an example structure of a two-dimensional orthogonal code suitable for the tape streamer drive 1 of this embodiment. An ECC of FIG. 5 includes a C1-series code (256, 240, 17) and a C2-series code (256, 192, 65) orthogonal to the C1-series code. In this case, each C1-series code is an intra-track code, and each C2-series code an inter-track code, and the total redundancy rate is 29.7%.

Note that the first figure in the above parentheses in each of the codes C1 and C2 represents the code length (the number of symbols in the code), the second figure the data length (the number of data symbols), and the last figure the minimum distance between codes. Also, their parity length (number of parity symbols) equals "the minimum distance between codes −1".

In the thus organized ECC, e.g., of the C1 series codes, C1(0) to C1(63) codes are recorded by the recording head 11A, C1(64) to C1(127) codes by the recording head 11B, C1(128) to C1(191) codes by the recording head 11C, and C1(192) to C1(255) codes by the recording head 11D, as shown in the figure. As a result, each C1-series code is recorded as an intra-track code whereas each C2-series code is recorded as a code across four tracks.

To reproduce a two-dimensional orthogonal code such as mentioned above, the error correcting circuit 9 shown in FIG. 1 corrects errors in a C1-series code, i.e., an intra-track code. In this case, the correction performed by the error correcting circuit 9 involves, e.g., correcting only up to four erroneous words, and otherwise suspecting that the whole code (256 symbols) would be erroneous in order to avoid any risk of miscorrection. And, based on the suspicion, the error correcting circuit 9 performs error correction as to the C2-series codes.

Here, if the error correcting circuit 9 judges all the data in the worst track to be suspicious erroneous and corrects errors in the rest of the tracks, then just a quarter of 256 bytes, that is, 64 bytes are suspicious words within each C2-series code, thus allowing the error correcting circuit 9 to perform loss correction. That is, according to the tape streamer drive 1 of this embodiment, even when one channel suffers a worst track with its data nearly totally corrupted during recording performed by increasing the number of recording heads to four, its data can be recovered.

Figure 6:
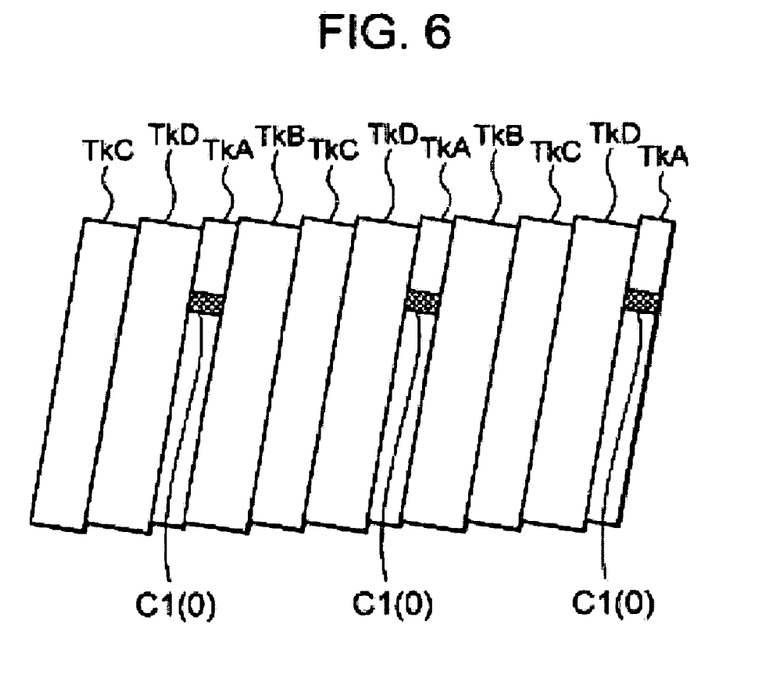
FIG. 6 schematically shows how a C1-series code is recorded across a plurality of tracks.

While the case where C1(0) to C1(63) codes in the C1 series are recorded with the recording head 11A, C1(64) to C1(127) codes with the recording head 11B, C1(128) to C1(191) codes with the recording head 11C, and C1(192) to C1(255) codes with the recording head 11D as shown in FIG. 5, has been described in this embodiment, it may be noted that this is merely an example. For example, a code in the C1 series is not necessarily recorded along one track, but may be recorded across a plurality of tracks TkA, TkA and so on formed by the same recording head 11A, as shown in, e.g., FIG. 6.

Alternatively, e.g., of the C1-series codes, the C1(0) code may be recorded by the recording head 11A, the C1(1) code by the recording head 11B, the C1(2) code by the recording head 11C, and the C1(3) code by the recording head 11D, whereas the C1(4) and subsequent codes may be recorded in the order of the recording heads 11A to 11D such as mentioned above.

Thus, by configuring the tape streamer drive 1 in this way, a helical scan recording method as one aspect of the present invention can also be implemented. That is, the code generating circuit 6 generates C1 parities for addition to a C1 data array and adds the generated C1 parities to the C1 data array to generate a C1-series code, and also generate C2 parities for addition to a C2 data array and adds the generated C2 parities to the C2 data array to generate a C2-series code, in such a manner that the ratio of the C2 parities to the C2-series code is 1/N or more (where N is the number of recording heads).

Then, the recording control circuit 7 may be arranged to control the output order of data such that one C1-series code is recorded onto a magnetic tape by any of the four recording heads 11A to 11D and one C2-series code is recorded by these heads 11A to 11D in a dispersed manner over a plurality of tracks. The circuit 7 may further control the recording heads 11A to 11D such that these heads are driven according to a serial data stream having its output order thus controlled.

In this embodiment, the four recording heads 11A to 11D are used to implement 4-channel recording as the rotary head drum 20 makes each revolution. And the C2-series codes are recorded across tracks TkA to TkD formed by these four heads 11A to 11D in a dispersed manner. For this reason, the redundancy rate of each C2-series code is set to 25% (¼) or more. This is only an example, however. The redundancy setting scheme according to the invention may be applicable as long as, e.g., a system performs N-channel recording using N recording heads. For example, if a system performs 5-channel recording using five recording heads, the redundancy rate of a C2-series code is (⅕), i.e., 20% or more, whereby even when one channel suffers a worst track with its data almost completely destroyed, such data can be recovered.

As is understood from the above description that according to the present invention, the redundancy rate of a C2-series code may be set to 1/N according to the number (N) of the recording heads used in the tape streamer drive 1. This provides an advantage that the larger the number of recording heads, the smaller the redundancy rate of a C2-series code. Even when only two or three recording heads are used, recorded data in any worst track can, of course, be recovered as long as the redundancy rate of a C2-series code is set to 1/N.

Finally, the embodiments and examples described above are only examples of the present invention. It should be noted that the present invention is not restricted only to such embodiments and examples, and various modifications, combinations and sub-combinations in accordance with its design or the like maybe made without departing from the scope of the present invention.

What is claimed is:

1. A recording apparatus of a helical scan type capable of recording data as inclined tracks onto a tape-shaped recording medium, comprising:

a rotary drum having N recording heads on a circumference thereof;

a first series code generating means for generating a first series code by adding a first parity to a first data array in a predetermined direction;

a second series code generating means for generating a second series code by adding a second parity to a second data array in a direction orthogonal to said direction of said first data array; and a recording control means for controlling recording such that said first series code is recorded by one of said N recording heads and said second series code is recorded by said N recording heads in a dispersed manner over a plurality of tracks, on said tape-shaped recording medium, wherein said second series code generating means generates said second series code such that a ratio between said second parity and said second series code equals at least 1/N, wherein said number N of said recording heads are 4 or more, and wherein said first series code is recorded across a plurality of tracks, which are formed by one of said N recording heads.

2. A recording method for a recording apparatus of a helical scan type which records data as inclined tracks onto a tape-shaped recording medium by N recording heads disposed on a circumference of a rotary drum, said method comprising the steps of:

generating a first series code by adding a first parity to a first data array in a predetermined direction;

generating a second series code such that a ratio between second parity and a second data array equals at least 1/N, wherein said second parity is added to said second data array in a direction orthogonal to said direction of said first data array of said first series code; and controlling recording such that said first series code is recorded by one of said N recording heads on said tape-shaped recording medium and said second series code is recorded by said N recording heads in a dispersed manner over a plurality of tracks, wherein said number N of said recording heads are 4 or more, and wherein said first series code is recorded across a plurality of tracks, which are formed by one of said N recording heads.

* * * * *